United States Patent [19]

Lair

[11] Patent Number: 5,176,340
[45] Date of Patent: Jan. 5, 1993

[54] THRUST REVERSER WITH A PLANAR EXIT OPENING

[76] Inventor: Jean-Pierre Lair, 8023 Vantage, Ste. 1450, San Antonio, Tex. 78230

[21] Appl. No.: 798,213

[22] Filed: Nov. 26, 1991

[51] Int. Cl.$^5$ ............................................. B64D 33/04
[52] U.S. Cl. ............................ 244/110 B; 239/265.19; 239/265.37
[58] Field of Search ................ 244/110 B, 23 D, 12.5; 239/265.19, 265.37, 265.33, 265.27; 60/226.2, 230

[56] References Cited

U.S. PATENT DOCUMENTS

| | | | |
|---|---|---|---|
| 2,715,312 | 8/1955 | Brame | 239/265.19 |
| 2,847,823 | 8/1958 | Brewer | 244/110 B |
| 3,568,792 | 3/1971 | Urquhart | 239/265.19 |
| 3,601,340 | 8/1971 | Hilbig | 239/265.19 |
| 4,129,269 | 12/1978 | Fage . | |

FOREIGN PATENT DOCUMENTS

2348371 11/1977 France .
182858 3/1963 Sweden ......................... 244/110 B

*Primary Examiner*—Galen Barefoot
*Attorney, Agent, or Firm*—Harold H. Dutton, Jr.

[57] ABSTRACT

A thrust reverser for use with a jet engine comprising a pair of symmetrical thrust reverser doors, each of which doors are pivotally attached to an attachment element on the jet engine pipe so as to be pivotally movable between reversing and non-reversing positions, each of the doors having a scarfed trailing edge portion so that in the reversing position; the trailing edge portions of the doors are in abutting contact; a pair of half-shells, one being associated with and surrounding the trailing edge portion of each of the doors, the half shells being pivotally attached to the attachment element and cooperatively forming a planar exhaust outlet for the jet engine.

17 Claims, 6 Drawing Sheets

THRUST REVERSER WITH A PLANAR EXIT OPENING

This invention relates to a thrust reverser for jet engines. More particularly, the invention relates to a thrust reverser which can be used with or without bypass of the main jet, and which is disposed downstream of the jet exhaust pipe.

BACKGROUND AND OBJECTS OF THE INVENTION

In order to reduce the landing distance of an aircraft, and also to increase the safety factor when the aircraft is landing on a wet or icy runway, thrust reversers are used on the jet engines in order to produce a braking thrust for slowing the craft. Such thrust reversers function to reverse the direction of the jet thrust, from a normally rearward direction used for propelling the craft, to a forward direction for slowing or braking the craft.

Thrust reversers are typically formed of reverser doors which are hingedly mounted on a fixed structure called a jet pipe, and usually form the final nozzle of the gas turbine engine. The trailing edge of the reverser doors must be fully scarfed in order to enable their deployment by hinged movement to a position in which the two doors abut against each other, either at their trailing edges or at abutment fittings.

French patent 2,348,371 and U.S. Pat. No. 4,129,269 illustrate the non-planar exit area of the nozzle when the reverser doors are in the stowed position. This exit area is often referred to as a "fish mouth" exit opening because of the shape of the opening when viewed from the side. Such a "fish mouth" opening is technically considered as non-planar. Such a fish-mouth or non-planar opening is commonly used for thrust reversers formed by hinged doors.

However, experience has shown that this shape rather significantly degrades the engine performance in a forward thrust mode of operation, and this degradation is caused by two combined factors. Firstly, there is a rather significant loss of nozzle efficiency because of efflux spillage sideways through the cut away portions created by the scarfs. Secondly, there is a significant thickness of the trailing edge of the reverser doors, leading to an excessive base area, in turn leading to a non-negligible base drag.

In addition, the thrust reversers according to these patents significantly change the inner flow lines of the jet stream through the engine, since the throat of the nozzle is (and must be) located upstream of the trailing edge of the reverser nozzle. Also, from the throat to the trailing edge of the reverser, the inner skin of the door has a cylindrical or divergent extension. Irrespective of the fishmouth exit, or the cut away portions created by the scarfs (which significantly degrade the engine nozzle performance), the structure extending aft of the throat of the nozzle increases the nozzle discharge coefficient at all engine pressure ratios. This in turn modifies the engine operating characteristics. Therefor, with this type of thrust reverser nozzle, it is necessary to modify the basic aircraft performance manual.

In British patent GB 2,168,298 A there is an attempt to eliminate the fishmouth opening of the thrust reverser doors when the thrust reverser is in the stowed position. Although the system described in this patent is an improvement over French patent 2,348,371 and U.S. Pat. No. 4,129,269, during the forward thrust operation of the nozzle, the structure nonetheless has drawbacks, as it does not completely eliminate the scarfs. Also, the trailing edge of the reverser doors has a significant thickness, meaning that the base drag of the proposed design is probably high.

French patent 86.09838 describes a system which differs from the present invention in that the reverser doors rotate forward of a fixed annular fairing. To do so, the pivot point of the doors, as described in this patent, must be located far forward of the trailing edge of the door and at a significant distance from the engine centerline to enable pivoting of the reverser doors inside the exhaust nozzle. The arrangement proposed in this design also improves the forward thrust performance of the engine with respect to the systems disclosed in French patent 2,348,968 and U.S. Pat. Nos. 4,129,269 and 3,550,855. However, the compatibility of the reverser with the engine is degraded because when the reverser doors are in the deployed position, they are closer to the primary and secondary flow exhaust nozzle, and therefore the engine surge margin is reduced in reverse.

Another prior art thrust reverser system utilizes what is commonly referred to as a "four bar" thrust reverser control system, and was designed by the Rohr Company and installed, for example, on the Boeing 737 and Douglas MD80 aircraft. In this arrangement, the thrust reverser doors do not form the flow line of the jet of the engine. In theory, this arrangement represents an improvement, as the exhaust of the nozzle is planar, but a significant drawback arises in that the thrust reverser doors rotate behind a fixed annular fairing which forms the nozzle exhaust when the reverser doors are stowed. This arrangement leads to a rather complex mechanism for driving the thrust reverser doors, and leads to installation of very large fairings to house the control system. Not only do these large fairings extend far aft of the exhaust flare of the nozzle when the reverser doors are stowed, but also alter very significantly the outer flow lines of the nacelle fairing of the jet engine. For these reasons, this system leads to a weight increase and more importantly a degradation of the aerodynamic characteristics in the forward thrust mode of operation.

French patent 88.14695 proposes another technique for eliminating the fishmouth opening. This system uses two movable flaps to partially close the fishmouth exit shape of the thrust reverser nozzle. However this system has the major drawback of requiring a specific actuation system for rotating the flaps out of the way of the thrust reverser doors when these doors are caused to deploy. For engines installed on the side of the rear fuselage of aircraft, it would be virtually impossible to apply this technique because of the lack of space available between the engine pylon and the reverser. Therefor, it would be impossible to deploy the inboard flap, and consequently the thrust reverser could not deploy.

The primary object of the present invention is to provide a thrust reverser which overcomes the disadvantages of existing thrust reverser systems.

Another object of the present invention is to provide a thrust reverser which forms the flow line of the jet of the engine and completely eliminates the fishmouth cutout of the exhaust nozzle when the reverser doors are in the stowed position. This means that when the reverser doors are stowed, the exit or outlet of the jet exhaust nozzle is planar, unlike the thrust reverser nozzle described in French patent 2,348,371 and U.S. Pat. No. 4,129,269.

A further object of the invention is to provide a thrust reverser arranged such that when the thrust reverser doors are commanded to deploy, the reverser doors drive the exhaust nozzle with them so that the reverser doors always remain upstream or forward of the exhaust nozzle structure.

Still another object of the invention is to provide a thrust reverser which does not alter the jet flow lines (usually defined by the engine manufacturer), so that the jet flow lines of the reverser nozzle according to the present invention are similar to the flow lines of a non-reversing nozzle. In addition, the base area of the trailing edge of the reverser nozzle need not be increased to accommodate the installation of the thrust reverser.

DESCRIPTION OF THE INVENTION

The thrust reverser according to the present invention comprises a pair of symmetrical thrust reverser doors, each of which is pivotally attached to attachment members on opposite sides of a jet engine pipe so as to be pivotally movable between reversing and non-reversing positions, in such a manner that in the non-reversing position, the inner skins of the reverser doors form a continuation of the gas flow surface of the jet pipe, and in the reversing position, the trailing edge of each of the doors, or more precisely the abutment fittings installed on the inner skins of the reverser doors, come into abutting contact with the corresponding portion of the other door. Implicit in the fact that the reverser doors can pivot into abutting contact is the fact that the trailing edges of the doors are scarfed. In the non-reversing position, the trailing edges of the reverser doors do not form the exhaust outlet or nozzle. Instead, a pair of half-shells are provided, so as to surround the downstream end of the reverser doors, and each of the half shells is pivotally attached to the same attachment members and is associated with one of the reverser doors for pivotal movement therewith. The half-shells together form the exhaust nozzle for the engine.

The exhaust nozzle may be either of the strictly convergent type, or may be of a convergent-divergent type, both of which types of nozzles are known, but in either event, the trailing edges of the reverser doors are scarfed to enable their pivotal movement, while the trailing edges of the half-shells form a planar nozzle exit when the reverser doors are in the stowed, non-reversing position.

Linkage arrangements connect the half-shells and the reverser doors, so that actuation of the reverser doors simultaneously actuates the pivoting of the half-shells between their respective reversing and non-reversing positions, and in the reversing position, the half-shells are moved by the linkage members so that the half-shells do not come into contact.

Thus, while the inner skins of the reverser doors are scarfed so as to enable their pivotal movement, the inner and outer skins, of the half-shells, are not scarfed, and thus can form a planar exhaust outlet for the engine, thereby avoiding degradation of the performance characteristics of the engine and the aircraft, or alternatively improving the performance with respect to prior art thrust reversers.

DESCRIPTION OF THE DRAWINGS

The present invention will be described in greater detail with reference to the accompanying drawings which serve to illustrate the invention by way of non-limiting example, and in which.

DETAILED DESCRIPTION OF PREFERRED EMBODIMENTS

Figure 1:
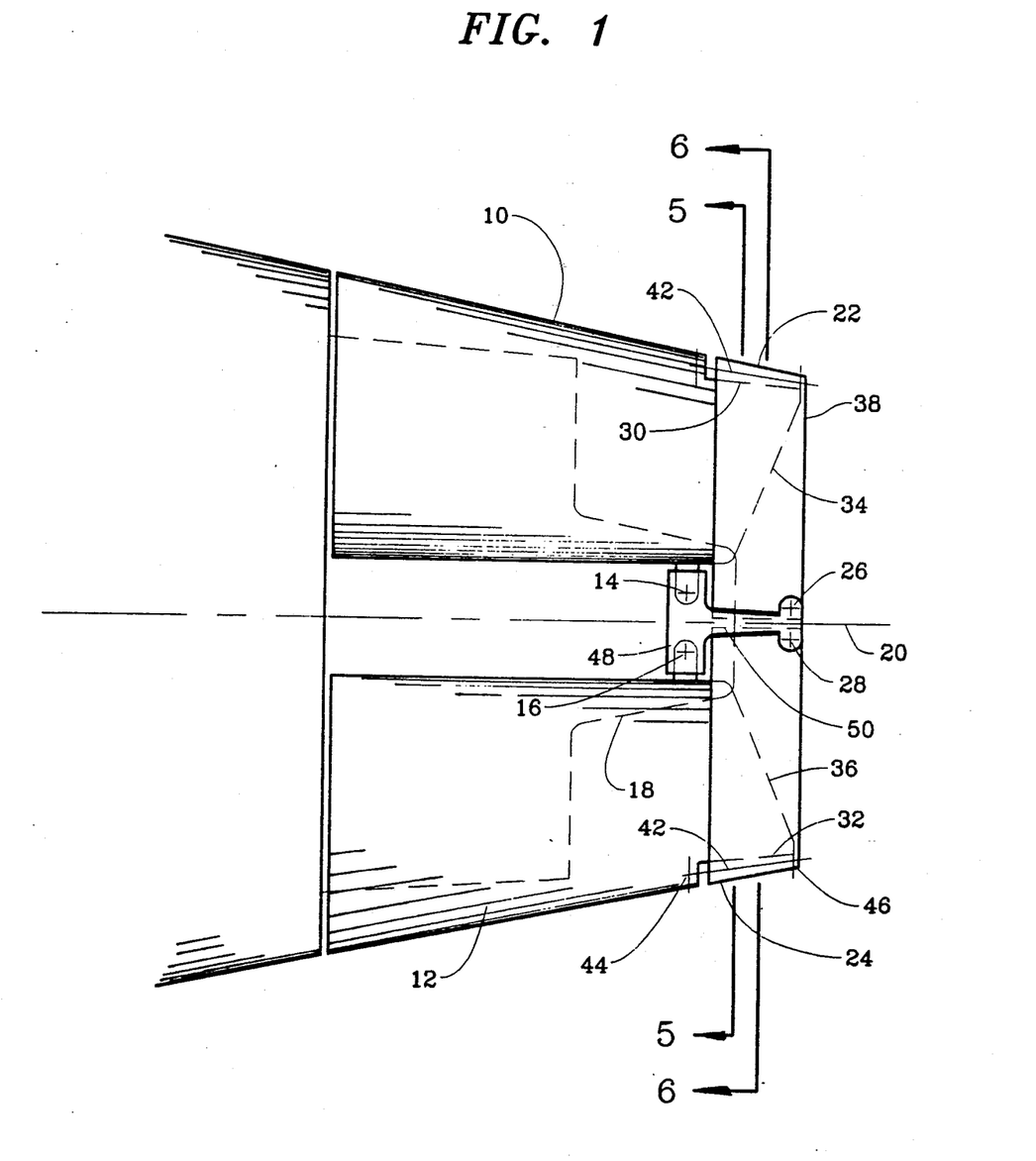
FIG. 1 is a schematic cross-sectional view of the thrust reverser in the stowed configuration.
Figure 2:
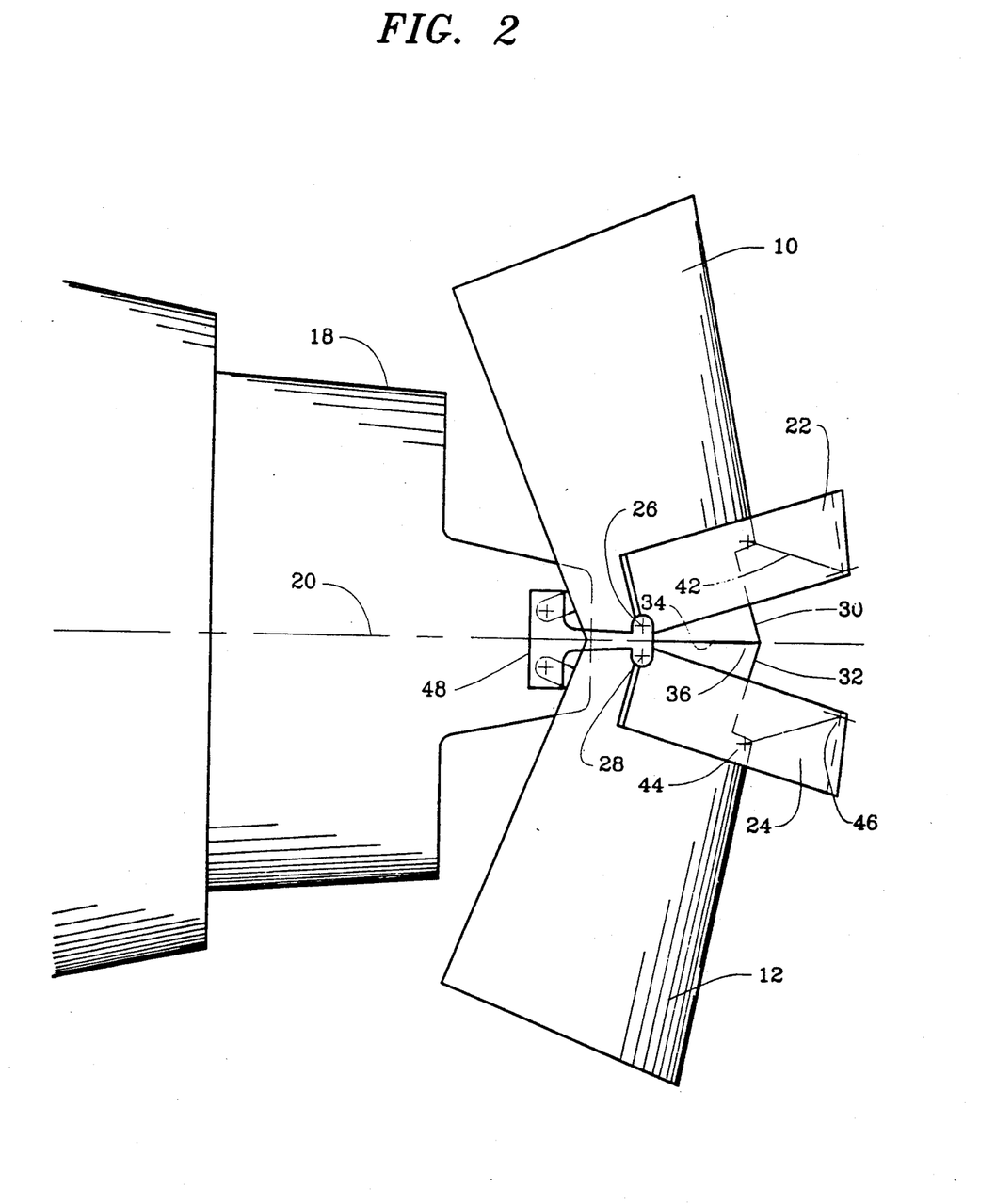
FIG. 2 is a schematic cross-sectional view of the thrust reverser in the deployed position.

As seen in FIGS. 1-4, the thrust reverser according to the present invention comprises a pair of doors 10 and 12. These doors are hingedly connected for pivotal movement at pivot points 14 and 16 which are arranged substantially diametrically of a jet pipe 18, in order that the doors 10 and 12 (or abutment fittings which could be installed as is known, but not shown) can come into abutment on the centerline 20 of the jet pipe when deployed as seen in FIG. 2. A pair of half-shells 22 and 24 form the exhaust nozzle and surround the downstream end of the reverser doors 10 and 12. These half-shells 22 and 24 are secured by pivotal attachment at pivot points 26 and 28.

When the thrust reverser doors 10 and 12 are in their non-reversing position, the inner skin 30, 32 of the thrust reverser doors 10 and 12, respectively, provide a continuation of the gas flow surface of the jet pipe 18. For convenience, only the downstream portion of the thrust reverser door inner skin 30, 32 is shown in FIGS. 1 and 2.

Figure 3:
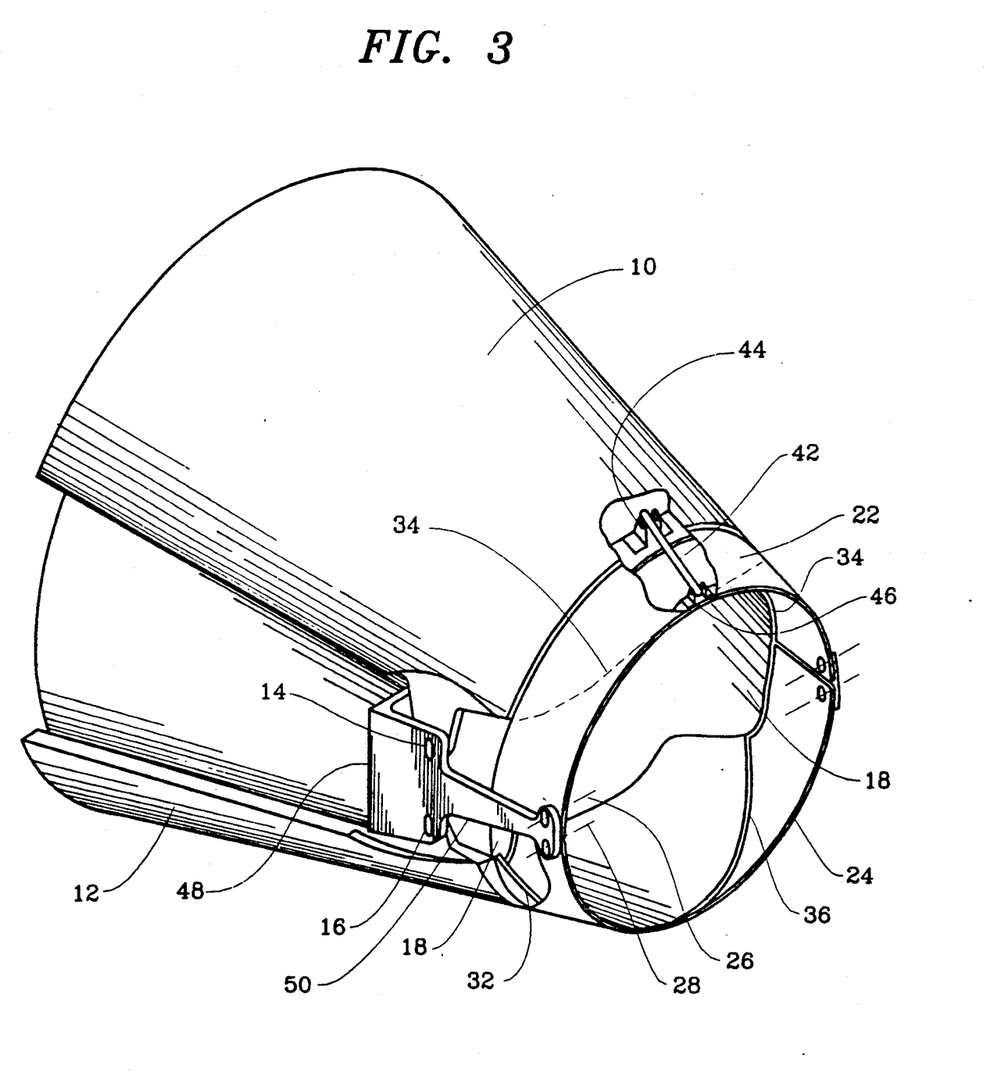
FIG. 3 is a perspective view of the thrust reverser in the stowed configuration.
Figure 4:
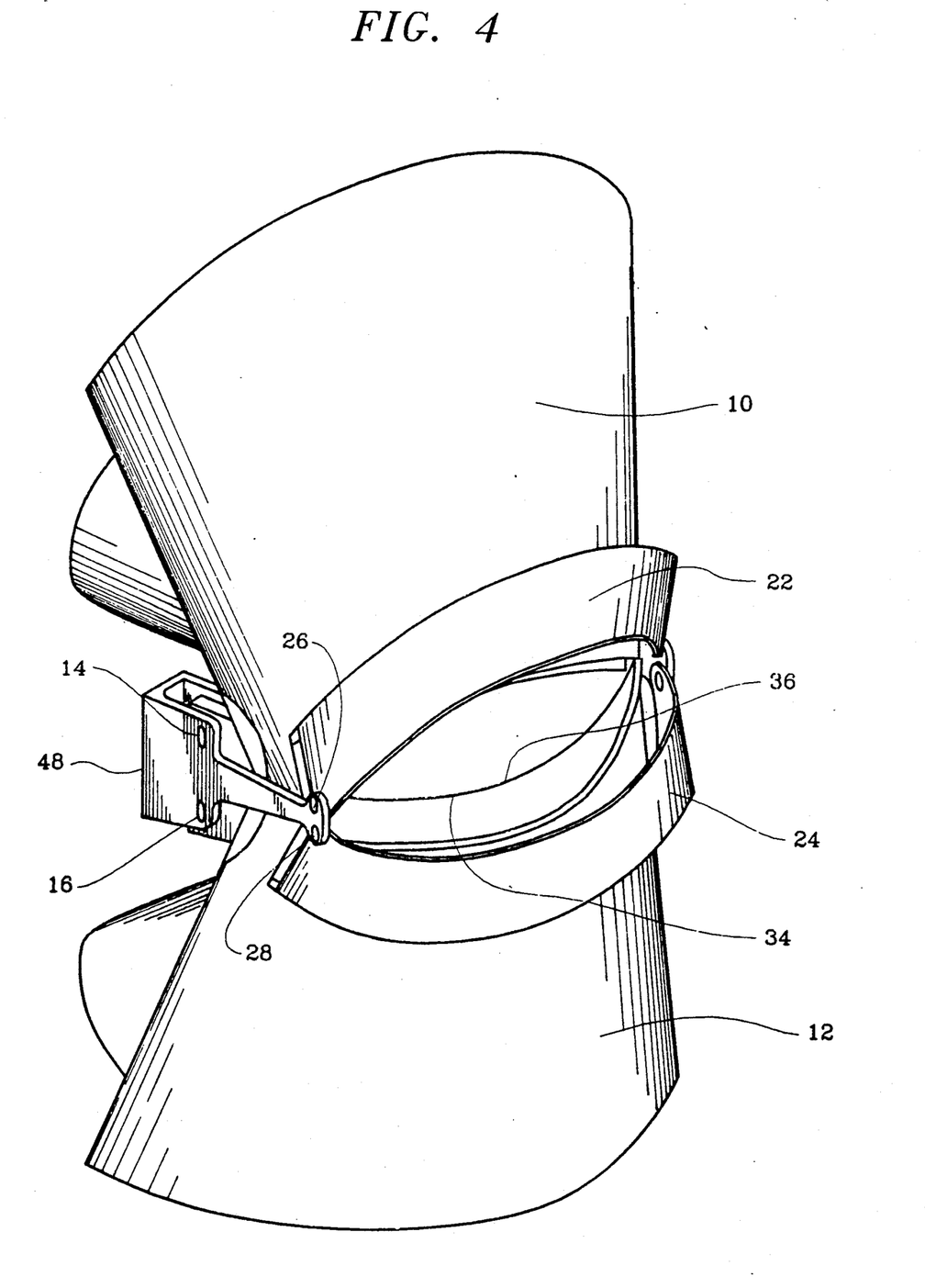
FIG. 4 is a perspective view of the thrust reverser in the deployed position.
Figure 5:
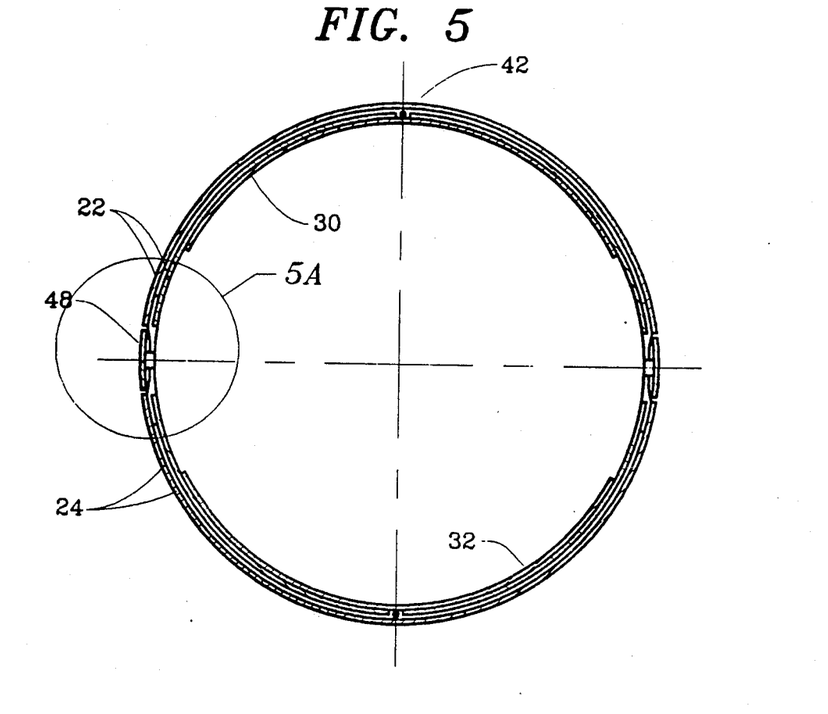
FIG. 5 is a cross-sectional view along lines 5—5 of FIG. 1 and viewed in the direction of the arrows.
Figure 5A:
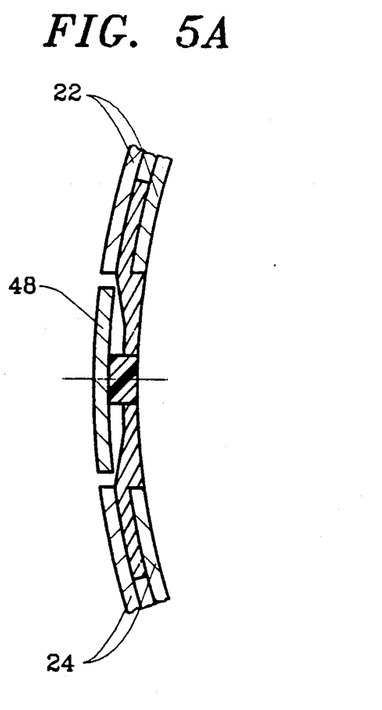
FIGS. 5a and 6a are enlargements of portions of 5 and 6.
Figure 6:
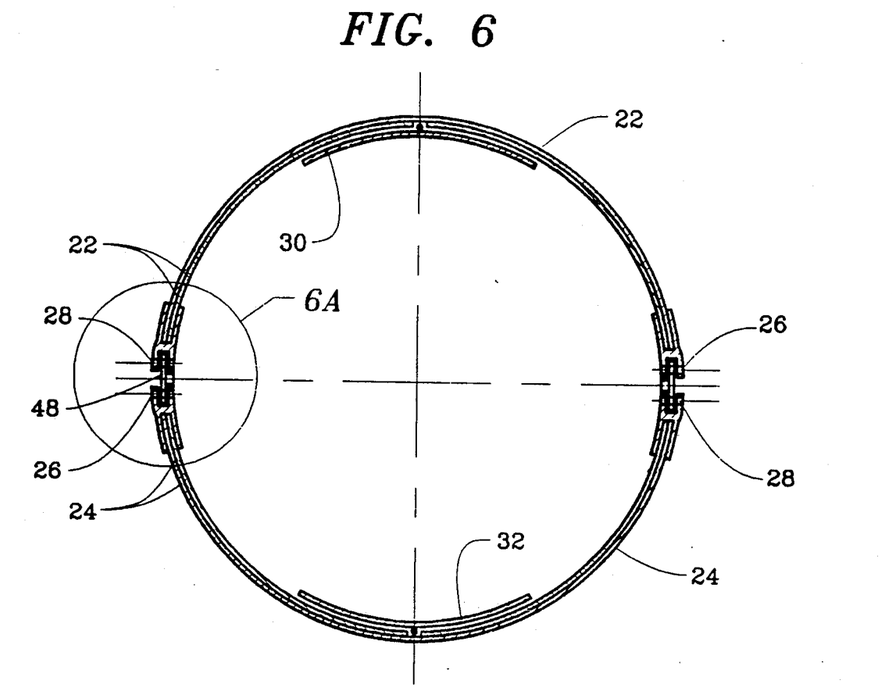
FIG. 6 is a cross-sectional view along lines 6—6 of FIG. 2 and viewed in the direction of the arrows.
Figure 6A:
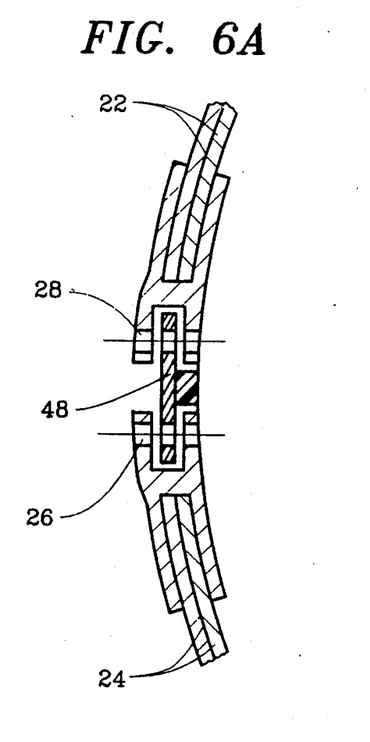

It is significant to note at this point that as seen in FIGS. 1 and 3, only the inner skin of the thrust reverser doors is scarfed along its trailing edge. These scarfed trailing edges are represented by 34 for thrust reverser door 10 and 36 for door 12. The definition or shape of the scarfed edges is such that when the doors 10, 12 are pivoted to their deployed state, the scarfed edges come into abutment on the axis 20 (centerline) of the jet pipe as seen in FIGS. 2 and 4.

Still with reference to FIGS. 1 and 3, when the thrust reverser doors 10, 12 are in the stowed position, the two half-shells 22, 24 re-establish the continuity of the inner skins 30, 32 along a trailing edge 38. This trailing edge 38 is essentially planar, for example circular, and orthogonal to the axis 20 of the jet pipe 18. In this manner, the half-shells 22, 24 completely eliminate the cut away portion (scarfing) of the reverser door inner skin, and form the exhaust nozzle for the engine.

In addition, the trailing edge thickness for the half shells 22, 24 is similar to what it would be if no thrust reverser was installed on the exhaust. As a result, this arrangement causes no degradation of engine performance, since there is no efflux spillage sideways of the exhaust nozzle, and the trailing base area is minimal, since essentially it is defined in the manner of a non-reversing nozzle by the inner and outer skin thicknesses of the half-shells 22, 24. Similarly, the half-shells 22, 24 form a continuation of the ambient airflow surface when the thrust reverser doors are stowed, as in FIGS. 1 and 3.

Figure 7:
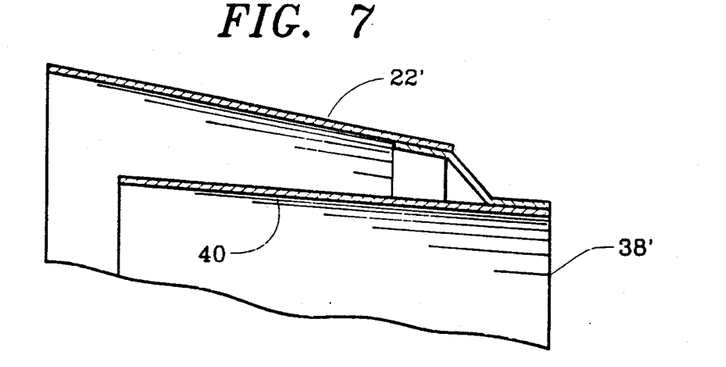
FIG. 7 is a fragmentary longitudinal sectional view showing one embodiment of a half-shell according to the invention.
Figure 8:
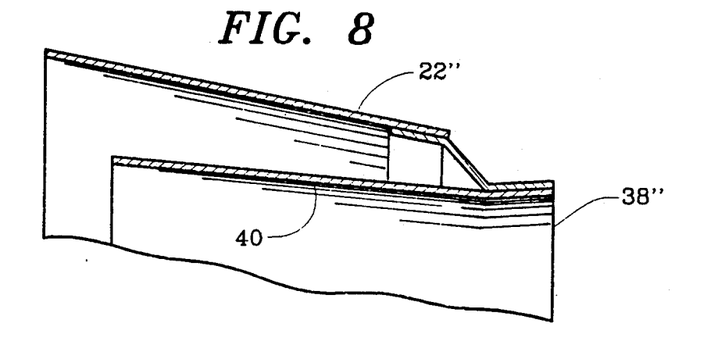
FIG. 8 is a fragmentary longitudinal sectional view showing another embodiment of a half-shell according to the invention.

The inner contour of the half-shells 22, 24 can either be strictly convergent (as seen in FIG. 7), or can incorporate a convergent-divergent structural arrangement (FIG. 8). In the configuration shown in FIG. 7, the trailing edge 38' of the half-shell 22' (only a portion of one half-shell being shown) defines the throat of the convergent exhaust nozzle 40. In the configuration seen in FIG. 8, the throat of the nozzle is slightly upstream of the trailing edge 38" of the half-shell 22", again only a portion of one half-shell being shown.

In the same manner as a non-reversing exhaust nozzle which incorporates a convergent-divergent inner profile, the thrust reverser exhaust nozzle, when fitted with a convergent-divergent exhaust as described herein, enables improved mass flow at low engine pressure ratios typical of take-off conditions. Thus, improved thrust is achieved.

Regardless of whether the design criteria of the half-shells 22, 24 is to be strictly convergent or convergent-divergent, the thrust reverser exhaust nozzle according to the present invention permits the same design criteria as in the case of a non-reversing exhaust nozzle. As a result, the engine operating characteristics are not affected by the thrust reverser installation, since the inner flow lines (which are usually defined by the engine manufacturer) are unchanged.

With the thrust reverser nozzle according to the present invention, not only is the engine performance not degraded, but also the engine operating characteristics are not affected.

When the two half-shells 22, 24 are stowed as in FIGS. 1 and 3, a seal (not shown) is provided between the inner skins 30, 32 of the thrust reverser doors 10, 12, and the half-shells 22, 24.

As shown in FIGS. 1-3, each half shell 22, 24 is connected to its corresponding thrust reverser door 10, 12 by a linkage member 42. One end 44 of the linkage member 42 is pivotally attached to the associated reverser door, while the other end 46 of the linkage member 42 is pivotally attached to the correspondingly associated half-shell. When the half shells are stowed (FIGS. 1, 3), the linkage is completely housed between the inner skin 30, 32 of the reverser door and the outer skin of the half shell. Therefor, the linkage member is completely transparent to the inner gas flow and the ambient outer airflow.

As shown in FIGS. 1-4, the attachment member 48 houses the pivots 14, 16 of the reverser doors 10, 12, as well as the pivots 26, 28 of the half-shells 22, 24. As seen, the attachment member 48 has an extension portion 50 which houses the pivot points 26, 28 of the half shells 22, 24. When the thrust reverser doors 10, 12 are caused to deploy (no control system is shown, for the sake of clarity and simplicity, this being known to the artisan), the linkage members 42 move the respective half shells 22, 24 and cause them to rotate about the pivots 26, 28. Each half-shell (FIGS. 2, 4) starts to surround the associated thrust reverser door, allowing the inner skin 13 and 14, as well as a portion of the reverser door outer skin, to penetrate inside the half-shells and then allow abutment of their trailing edges 34, 36 (or abutment fittings) along the centerline 20. When the reverser doors 10, 12 reach their fully deployed positions, the half shells 22, 24 are positioned aft of the associated reverser doors and consequently are not subjected to the reverse flow. For this reason, the structure of the half-shells can be of lightweight material as they are subjected to only very small aerodynamic loading.

When the thrust reverser doors are directed by the control system (not shown) to return to the stowed position, in turn the linkage arrangement 42-46 will reposition the half-shells to their stowed position, ensuring the correct inner and outer gas flow continuity as discussed above.

It will also be appreciated that the force required to rotate the half shells is very minimal, since the arrangement as described provides a maximum moment arm through the linkage and attachment members 42-50 as described.

While this invention has been described as having certain preferred features and embodiments, it will be understood that it is capable of still further variation and modification without departing from the spirit of the invention. For example, while the invention has been described with regard to two thrust reverser doors, it will be understood that the same principles will apply using, for example, three such doors with three half-shells, and this application is intended to cover any and all such variations, modifications and adaptations of the invention as fall within the spirit of the invention and the scope of the appended claims.

I claim:

1. A thrust reverser for use with a jet engine comprising a pair of symmetrical thrust reverser door members, each of said door members being pivotally attached to an attachment member on the jet engine pipe so as to be pivotally movable between reversing and non-reversing positions, each of said door members having a scarfed trailing edge portion so that in said reversing position, the trailing edge portions of said door members are in abutting contact, a pair of half-shells, one being associated with and surrounding the trailing edge portion of each of said door members, said half shells being pivotally attached to said attachment member, and said half shells cooperatively forming a planar exhaust outlet for said jet engine.

2. A thrust reverser as in claim 1 and including linkage means connecting each of said door members with the associated half-shell so that pivoting of said door members causes pivoting of the associated half-shell.

3. A thrust reverser as in claim 2 and wherein the inner skin of said door members forms a portion of the jet flow line.

4. A thrust reverser as in claim 3 and wherein the pivot points for said door members are spaced from the pivot points for said half-shells along said attachment member.

5. A thrust reverser as in claim 1 and wherein said exhaust outlet is strictly convergent.

6. A thrust reverser as in claim 5 and wherein the throat of said exhaust outlet is located at the trailing edge of said exhaust outlet.

7. A thrust reverser as in claim 1 and wherein said exhaust outlet is convergent-divergent.

8. A thrust reverser as in claim 7 and wherein the throat of said exhaust outlet is slightly upstream of the trailing edge of said exhaust outlet.

9. A thrust reverser for use with a jet engine comprising a pair of symmetrical thrust reverser door members, each of said door members being pivotally attached so as to be movable between a reversing position in which said doors deflect gaseous exhaust from said engine, and a non-reversing position, each of said door members having a scarfed trailing edge portion so that in said reversing position, the trailing edge portions of said door members are in abutting contact, and said thrust reverser forming a planar exhaust outlet for said jet engine when in said non-reversing position.

10. A thrust reverser as in claim 9 and wherein said thrust reverser door members each comprises a door section having a scarfed trailing edge and a half-shell surrounding said trailing edge, said door sections and said half-shells each being pivotally attached to said jet pipe.

11. A thrust reverser as in claim 10 and including linkage means connecting each of said door sections with the associated half-shell in such a manner that pivoting of said door section causes pivoting of the associated half-shell.

12. A thrust reverser as in claim 11 and wherein the trailing edge portions of said half-shells form said planar exhaust outlet.

13. A thrust reverser as in claim 12 and wherein the trailing edge portions of said door sections are in abutment on the centerline of said jet pipe when said door members are in said reversing position.

14. A thrust reverser as in claim 13 and wherein said halfshells are positioned aft of said door sections when said door sections are in said reversing position.

15. A thrust reverser as in claim 13 and wherein said half-shells are positioned away from the exhaust gases of said engine when said door sections are in said reversing position.

16. A thrust reverser as in claim 13 and wherein said half-shells are shielded from the exhaust gas flow from said engine when said door sections are in said reversing position.

17. A thrust reverser as in claim 9 and wherein the throat of said exhaust outlet is located at the trailing edge of said planar exhaust outlet.

* * * * *